G. E. COX.
APPARATUS FOR MAKING CALCIUM CYANAMID.
APPLICATION FILED FEB. 28, 1919.
1,317,756.
Patented Oct. 7, 1919.
3 SHEETS—SHEET 1.
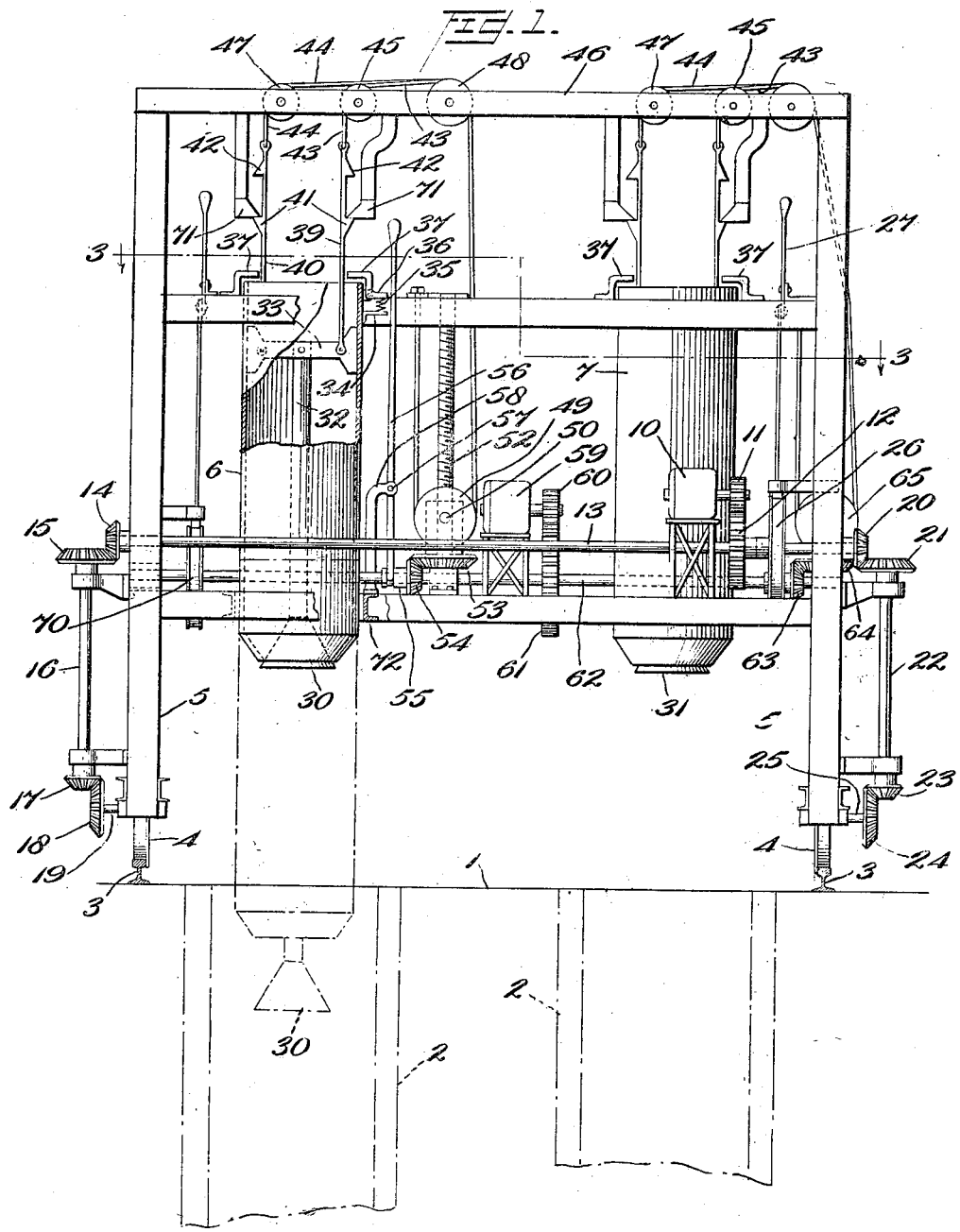
Inventor
George E. Cox, by
T. G. Witherspoon
Attorney

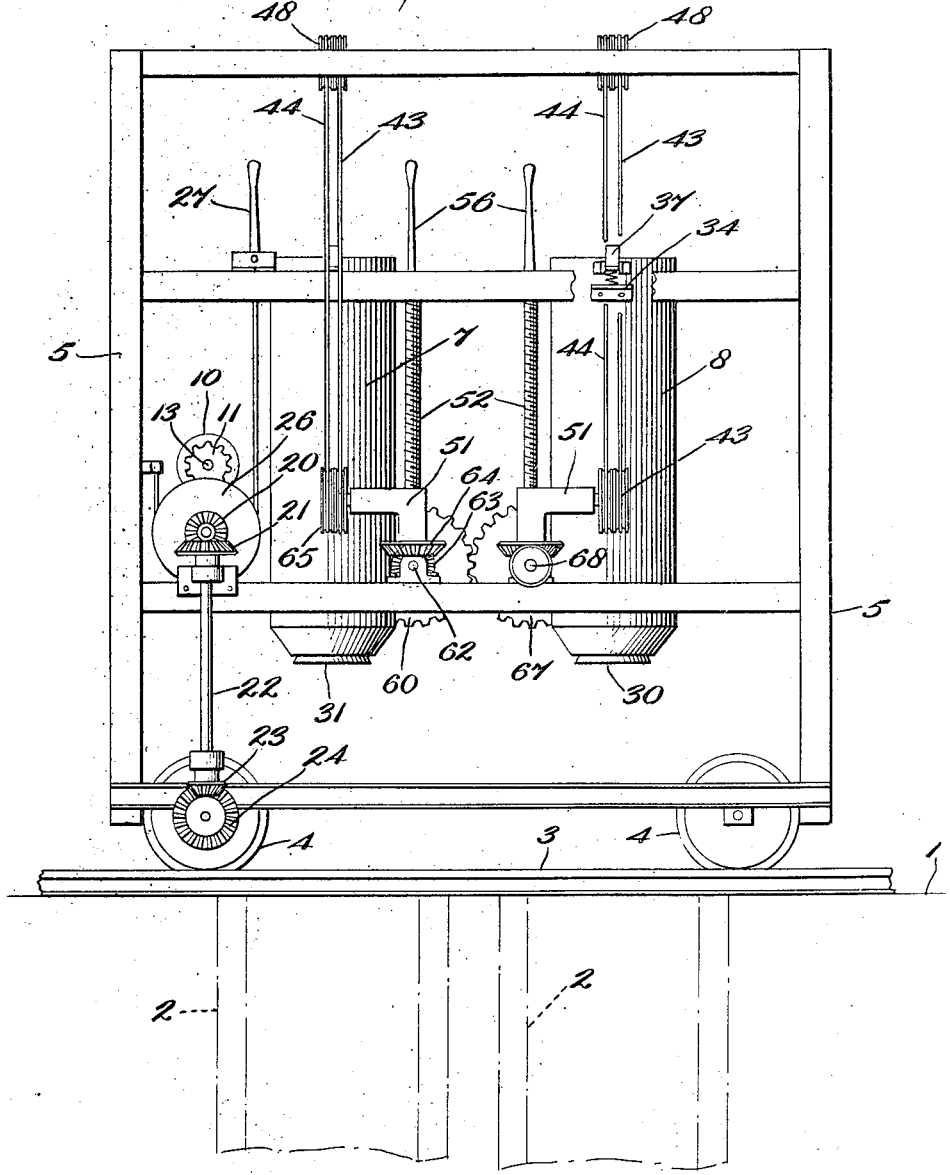

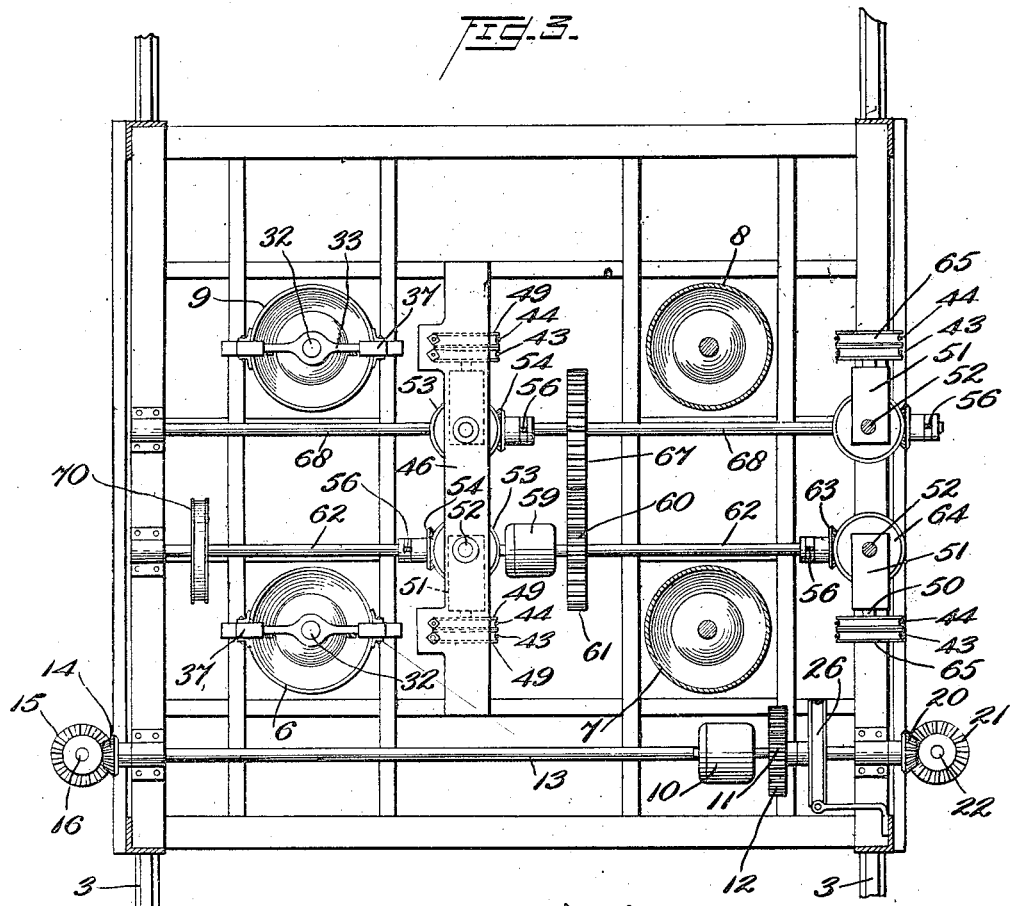
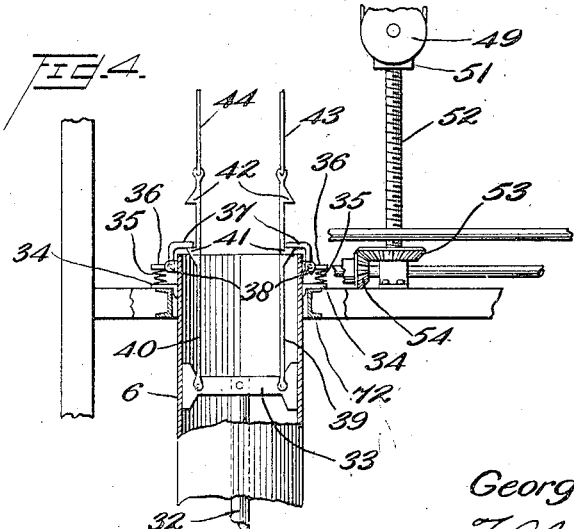

UNITED STATES PATENT OFFICE.

GEORGE E. COX, OF NIAGARA FALLS, NEW YORK, ASSIGNOR TO AMERICAN CYANAMID COMPANY, OF NEW YORK, N. Y., A CORPORATION OF MAINE.

APPARATUS FOR MAKING CALCIUM CYANAMID.

1,317,756.     Specification of Letters Patent.     Patented Oct. 7, 1919.

Application filed February 28, 1919. Serial No. 279,901.

*To all whom it may concern:*

Be it known that I, GEORGE E. COX, a citizen of the United States, residing at Niagara Falls, in the county of Niagara and State of New York, have invented certain new and useful Improvements in Apparatus for Making Calcium Cyanamid; and I do hereby declare the following to be a full, clear, and exact description of the invention, such as will enable others skilled in the art to which it appertains to make and use the same.

This invention relates to an apparatus for facilitating the handling and consumption of materials entering into the manufacture of commercial calcium cyanamid, and has for its object to accomplish these results in a simple and more efficient manner than has been heretofore proposed.

To these ends the invention consists in the novel parts and combinations of parts constituting the apparatus, all as will be more fully hereinafter disclosed and particularly pointed out in the claims.

Referring to the accompanying drawings, forming a part of this specification in which like numerals designate like parts in all the views—

Figure 1 is a side elevational view partly in section of an apparatus made in accordance with this invention;

Fig. 2 is an end elevational view partially broken away, of a portion of the parts shown in Fig. 1;

Fig. 3 is a plan view of the parts shown in Fig. 1; and—

Fig. 4 is a partially sectional detail view of a portion of the parts shown in Fig. 1.

In order that the precise invention may be the more clearly understood, it is said:—

In my U. S. Patent #1,282,381, dated Oct. 22, 1918, entitled method of making calcium cyanamid, I have disclosed an improved process of making commercial calcium cyanamid wherein finely divided calcium carbid is charged into a suitable container, while the latter is in place in the cyanamid oven, and then this said mass of charged carbid is heated to a requisite temperature in the presence of nitrogen to form the desired calcium cyanamid.

In this application, on the other hand, I am disclosing and claiming an apparatus which makes commercially possible the carrying out on a large scale of the process disclosed in the above mentioned U. S. patent. It is well known that in the production of cyanamid on a large scale, there is involved the use of a number of individual containers or ovens for reacting on the carbid with nitrogen. The economic efficiency and capacity of any single cyanamid oven is limited to a comparatively few thousand pounds, or less of carbid, while the period of nitrification often runs from one to four, or more days, depending upon the size of the ovens.

As a result the cyanamid plant, if it is to have a very large output, must be equipped with a comparatively large number of ovens, each of which is usually a duplicate of the other, and they are generally regularly arranged in rows equally spaced apart.

The filling of this large number of ovens each with its carbid container in place, is at present rendered possible through the use of an overhead crane, but in view of the number of ovens in a large plant, as well as in view of the fact that the overhead crane must also handle the finished cyanamid, I have found it a decided improvement to use an independent system of oven charging, and an apparatus for such purpose, as is more fully disclosed below, constitutes an important part of said system.

Referring now to the drawings disclosing such an apparatus, 1 indicates the surface of the floor or ground beneath which the ovens 2 are located, and 3 indicates suitable tracks upon which the wheels 4 of a suitable framework 5 roll. The framework 5 in fact constitutes a car on which is supported a plurality of containers such as 6, 7, 8 and 9. It is, of course, evident that these containers need not be limited to four in number, but the car may support a lesser or greater number if desired, provided they are so spaced as to register with the fixed ovens such as 2 that they will charge. The car itself is propelled through the medium of a motor 10 which operates the pinion 11 meshing with the gear 12, mounted on the shaft 13, provided at one end with the bevel 14 meshing with the bevel 15 carried by the shaft 16, having the bevel 17 meshing with the bevel 18, mounted on the axle 19 of one of the wheels 4.

Said shaft 13, at its opposite end is provided with a bevel gear 20 meshing with the bevel gear 21, carried by the shaft 22, provided with the bevel gear 23, meshing with the bevel gear 24, carried by the axle 25 of another one of the wheels 4. It thus results that a pair of wheels on opposite sides of the car are positively actuated by the motor 10 as will be clear from the drawings.

A brake 26 actuated by the hand lever 27, controls the rotation of the shaft 13, and therefore, the speed of the car. In fact, said brake enables one to stop the car and hold it fixed at any point of its travel. Containers 6, 7, 8 and 9 are preferably of a cylindrical form, but of course, may be of any other form and are also preferably of an air tight construction with an open top.

They are closed at the bottom as by the bells such as 30 and 31. Each of the bells is supported or sustained by the rod like member 32 which in turn is secured to a guide 33 which slides inside the containers, as will be clear from Fig. 1. The container 6, as well as each of the other containers are provided with oppositely disposed lugs 34, see Fig. 4, only one of which is shown in Fig. 1, and resting on these lugs are springs 35 coacting with extensions 36 of the bell cranks 37. The said bell cranks or dogs 37 are adapted to be tipped outward on their pivots 38 in order to release certain portions of the mechanism as will presently appear.

Secured to the guides 33, in each of the containers, are the rods 39 and 40, as best illustrated in Fig. 4, and these said rods are provided with the lugs 41 and 42. To said rods 39 and 40 are respectively secured the flexible cables 43 and 44. The cables 43 pass over the pulleys 45 secured in the upper frame work 46, and the cables 44 pass over the pulleys 47 likewise secured in said frame work 46. Both of the cables 43 and 44 pass over appropriate pulleys 48 secured in said frame work 46, and down under appropriate pulleys 49, fastened to the cross heads 50 which are integral with nuts 51 threaded on the screw rods 52, all as will be clear from the drawings, it being understood that only one complete mechanism of this kind is fully illustrated in connection with container 6.

Referring especially to the container 6, its screw 52 at its lower end carries the bevel gear 53 meshing with the bevel pinion 54 and associated with said pinion 54 is the slide or clutch like member 55 controlled by the hand lever 56, pivoted as at 57 in the standard of bracket 58. 59 represents a motor provided with the pinion 60 meshing with the gear 61 carried by the shaft 62 on which is mounted the drive bevel gear 54. Also mounted on said shaft 62 is a similar drive bevel pinion 63 meshing with a gear 64 adapted to operate another screw 52 as is indicated in Fig. 3, and which is associated with the container 7.

The pulley associated with said other screw, 52, however, is indicated on Figs. 1 and 2, of the drawings, and is numbered 65. Around the said pulley 65 passes both of the cables 43 and 44, and in fact the entire mechanism associated with the container 7 is a duplicate of the mechanism associated with the container 6 as above stated. The same remarks apply to each of the other containers such as 8 and 9.

In fact, it is repeated that for the sake of clearness, and to prevent unnecessary duplication, I have only fully illustrated a complete mechanism of one of the containers 6. But, of course, each of the other containers constitutes an independent unit and in all respects a duplicate of said container 6, and its associated mechanism. In order that the power may be distributed from the motor 59 to each of the containers, the gear 61 meshes with another gear 67 carried by a shaft 68 in all respects a duplicate of the shaft 62. This said shaft 68 through appropriate mechanism, which is a duplicate of that associated with shaft 62 distributes power to pulleys not shown, but similar to the pulley 49 and which are respectively associated with the other containers such as 8 and 9, all as will be clear from Fig. 3.

A suitable brake 70, located on the shaft 62, controls the power from the motor 59 and a pair of stops 71 best shown in Fig. 1, further controls the power from motor 59 as will presently appear. Around each container is a frame 72 only one being shown in connection with container 6, and during the descent of each container their stops 34 take against their appropriate frames 72 and thus limit the downward movement of each container.

It should be repeated that the containers such as 6, 7, 8 and 9, carried by the car are so located and disposed that they will accurately register with their appropriate ovens such as 2, which are sunk beneath the floor 1, and whose upper surfaces are preferably flush with said floor 1.

The operation of the device will be clear from the foregoing, but may be briefly summarized as follows:—

The operator, through the motor 10 runs the whole carriage to his filling station, not shown, where one or more of the containers 6, 7, 8 and 9 will receive their charge of finely ground carbid. The containers when being charged are in their uppermost positions, as indicated in Fig. 1, and after having been properly charged the car or carriage is then run by the said motor 10 to the ovens 2 which are awaiting charging, and said containers by said motor 10 and brake mechanism, are accurately suspended over those ovens which have been selected for filling.

These ovens are presumed to have received their combustible containers as indicated in my prior patent, above mentioned, and are supposed to be awaiting the charge of the carbid. The operator then, by means of the motor 59 and clutch mechanism 55, associated with each container revolves a screw 52 of the particular container he wishes to empty in such a direction as to raise its corresponding pulley 49 and to thus lower the said particular container, as is indicated in dotted lines in Fig. 1, for example. This lowering continues until the lugs 34 of the container in question rest upon the corresponding frame 72, whereupon the container can go no farther.

A continued rotation of the appropriate screw 52 however has the effect of dropping the closing bell 30, and thus permitting the carbid to slide out of the lower end of the container into the appropriate oven 2. The bell 30 is dropped by the means just described until the lugs 41 contact with the bell cranks or dogs 37, and occupy a position below said dogs which thereupon spring back and in turn occupy a position above said lugs 41.

The operator next hoists the container by reversing the direction of the driving screw 52, in which case, both the container and the bell 30 are lifted but the bell will remain open during this lifting action. The charge of carbid will slide out of the container into the oven by about the time the lower end of the container leaves the upper end of the oven. When the lifting of the container has proceeded until the lugs 42 have struck their stop 71, said lugs will move inward from said stops 71 thereby placing the rods 39 and 40 inward, and forcing the said lugs 41 out of contact with their appropriate dogs 37.

The forcing of said lugs 41 out of contact with the dogs 37 will permit the container in question to drop a short distance, or down to the bell 30, whereupon the hoisting of the container will continue until the latter rises to its normal position with the lugs 41 in contact with the stops 71, or until a suitable limit switch, not shown, comes into operation and stops the motor 59. The same operation as that above disclosed is carried out in connection with each of the containers which register over an oven to be charged, and when they have been returned to their normal positions, in the manner just disclosed, the said containers are ready for recharging.

It is obvious that those skilled in the art may vary the details of construction, as well as the arrangement of parts without departing from the spirit of the invention, and therefore, I do not wish to be limited to the above disclosure except as may be required by the claims.

What I claim is:—

1. In an apparatus for charging a cyanamid oven with finely divided carbid, the combination of a supporting frame; means for propelling said frame; a container for holding finely divided carbid carried by said frame; means for causing said container to register with said cyanamid oven; means for raising and lowering said container relatively to said frame; a closure for said container; and means for raising and lowering said closure relatively to and outside of said container to discharge the contents of said container into said oven, substantially as described.

2. In an apparatus for charging a plurality of cyanamid ovens with finely divided carbid, the combination of a supporting frame work; a plurality of containers for said carbid so located on said frame work as to register with a plurality of said ovens when standing over the same; means for lowering said containers into said ovens; and means comprising movable rods and cables for discharging said carbid from said containers into said ovens, substantially as described.

3. In an apparatus for charging a plurality of cyanamid ovens with finely divided carbid, the combination of a supporting frame work; a plurality of containers for said carbid so located on said frame work as to register with a plurality of said ovens when standing over the same; means for moving said frame work into such a position that said containers will register with said ovens; means for lowering said containers into said ovens; means comprising closures, movable rods and cables for operating said closures for discharging said carbid from said containers into said ovens; and means for raising said containers out of said ovens, substantially as described.

4. In an apparatus for charging a plurality of cyanamid ovens with finely divided carbid, the combination of a car; a track for said car; a motor for propelling said car along said track; a plurality of vertically disposed containers for said carbid so located on said car as to register with said ovens when standing over the same; means comprising vertically disposed rods cables and closures for closing the lower ends of said containers; means for lowering said containers and closing means into said ovens; and means for opening the lower ends of said containers after entering said ovens, substantially as described.

5. In an apparatus for charging a plurality of cyanamid ovens with finely divided carbid, the combination of a car; a track for said car; a motor for propelling said car along said track; a plurality of vertically disposed containers for said carbid so located on said car as to register with said ovens when standing over the same; means comprising a bell shaped member for closing the lower ends of said containers; means comprising a motor and screw for lowering said containers and closing means into said ovens; and means for limiting the downward descent of said containers while not stopping the downward descent of said closing means and thus opening the lower ends of said containers, substantially as described.

6. In an apparatus for charging finely divided carbid into a cyanamid oven the combination of a container for said carbid open at one end; a closure for the other end of said container; a rod extending from said closure inside said container toward its open end; a guide carried by said rod on the inside of said container; a pair of rods attached to said guide; and a hoisting cable attached to each rod, substantially as described.

7. In an apparatus for charging finely divided carbid into a cyanamid oven the combination of a container for said carbid open at one end; a closure for the other end of said container; a rod extending from said closure inside said container toward its open end; a guide carried by said rod on the inside of said container; a pair of rods attached to said guide; a hoisting cable attached to each rod; means for raising and lowering said closure and container by means of said hoisting cables; and means to limit the descent of said container.

8. In an apparatus for charging finely divided carbid into a cyanamid oven the combination of a container for said carbid open at one end; a closure for the other end of said container; a rod extending from said closure inside said container toward its open end; a guide carried by said rod on the inside of said container; a pair of rods attached to said guide; a hoisting cable attached to each rod; means for raising and lowering said closure and container by means of hoisting cables; means to limit the descent of said container; stops carried on said rods; and dogs and stops coacting with said first named stops whereby said container may fall a limited distance independently of said closure and said closure may rise a limited distance independently of said container, substantially as described.

9. In an apparatus for charging finely divided carbid into a cyanamid oven, the combination of a container for holding the said carbid; a bell closure for said container; a rod like means connected with said bell closure provided with stops; a dog like means carried by said container coacting with said stops; a supporting frame; stop like means carried by said frame also coacting with said first named stops; cable means connected to said rod like means; hoisting means for actuating said cable means; a limiting stop carried by said container for limiting its downward movement; and a limiting stop carried by said supporting frame for coacting with said first named limiting stop, substantially as described.

10. In an apparatus for charging finely divided carbid into a cyanamid oven, the combination of a container for holding the said carbid; a bell closure for said container; a rod like means connected with said bell closures provided with stops; a dog like means carried by said container coacting with said stops; a supporting frame; stop like means carried by said frame also coacting with said first named stops; cable means connected to said rod like means; hoisting means for actuating said cable means; a limiting stop carried by said container for limiting the downward movement; a limiting stop carried by said supporting frame for coacting with said first named limiting stop; and means comprising a motor and track for moving said frame and container over said oven, substantially as described.

In testimony whereof I affix my signature in presence of two witnesses.

GEORGE E. COX.

Witnesses:
  Isabel M. Connelly,
  E. L. French.